Figure 1:
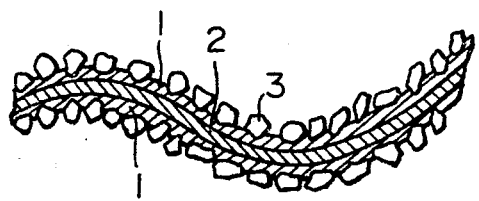

United States Patent [19]

Shimomai et al.

[11] 3,998,988
[45] Dec. 21, 1976

[54] CONJUGATE FIBER, FIBROUS MATERIAL AND FIBROUS ARTICLE MADE THEREFROM AND PROCESS FOR PRODUCTION THEREOF

[75] Inventors: Akiro Shimomai, Iwakuni; Iwao Fujimoto, Waki; Isao Hamana, Iwakuni; Kiyoji Katayama, Tokyo, all of Japan

[73] Assignee: Teijin Limited, Osaka, Japan

[22] Filed: July 11, 1975

[21] Appl. No.: 595,167

Related U.S. Application Data

[63] Continuation of Ser. No. 509,259, Sept. 25, 1974, abandoned, which is a continuation-in-part of Ser. No. 210,766, Dec. 22, 1971, abandoned.

[30] Foreign Application Priority Data

Dec. 24, 1970  Japan .......................... 45-118370
May 4, 1971  Japan .......................... 46-29594
June 11, 1971  Japan .......................... 46-41534

[52] U.S. Cl. .............................. 428/400; 428/372; 428/373; 428/374
[51] Int. Cl.² ..................... B32B 27/34; D02G 3/00
[58] Field of Search .......... 428/372, 373, 395, 400, 428/394, 374, 375; 156/279, 62.2

[56] References Cited

UNITED STATES PATENTS

| | | | |
|---|---|---|---|
| 3,511,747 | 5/1970 | Davies ............................. | 156/306 |
| 3,520,766 | 7/1970 | Newman ........................... | 428/281 |
| 3,589,956 | 6/1971 | Kranz et al. ..................... | 156/62.4 |
| 3,658,626 | 4/1972 | Berger et al. .................... | 156/62.2 |

*Primary Examiner*—Lorraine T. Kendell
*Attorney, Agent, or Firm*—Sherman & Shalloway

[57] ABSTRACT

A conjugate fiber of a thermoplastic synthetic organic polymer composed of a high melting polymer component and a low melting polymer component, said low melting polymer component having a melting point at least 40° C. lower than that of the high melting polymer component, and having adhered to its surface finely divided particles of an adsorbent. The fiber is a good filter having reduced pressure loss and increased adsorbing power. Fibrous materials and articles are made from these conjugate fibers.

4 Claims, 4 Drawing Figures

CONJUGATE FIBER, FIBROUS MATERIAL AND FIBROUS ARTICLE MADE THEREFROM AND PROCESS FOR PRODUCTION THEREOF

This application is a continuation of Ser. No. 509,259, filed Sept. 25, 1974 which in turn is a continuation-in-part of U.S. Pat. application Ser. No. 210,766 filed Dec. 22, 1971, both of which are now abandoned.

This invention relates to a conjugate fiber of a thermoplastic synthetic organic polymer, and to fibrous materials and articles made therefrom.

Adsorbents such as active carbon or silica gel are used mostly in powdery or granular form, and their handling is difficult. There is great loss of pressure when a fluid passes through a layer of the powdery or granular adsorbent. This tendency becomes especially pronounced if the adsorbent is in the finely divided form. Thus, the use of finely divided adsorbent having a high rate of adsorption requires a packing column for the adsorbent which is stucturally strong, and also an additional device for collecting and post-treating the adsorbent that has leaked out of the column. Another disadvantage is that such finely divided particles of the adsorbent tends to pollute the working environment. Furthermore, the finely divided particles of the adsorbent result in a high packing density, and have poor compatibility with a fluid to be filtered, which in turn leads to a reduction in the efficiency of filtering the fluid by adsorption.

In an attempt to remove such defects, research and development efforts in this area have recently been accelerating towards the end of developing a method of adhering an adsorbent such as active carbon or silica gel to the surface of an assembly of fibrous material.

One typical attempt comprises dispersing natural cellulose or synthetic fibers and an adsorbent in water, and forming the suspension into sheets by the wet method to thereby cause the particles of the adsorbent to be present in the sheet-like assembly. According to this method, however, the adsorbent by the flocculating agent cannot be avoided, and therefore, the amount of the adsorbent to be added should be increased. Furthermore, such filtering materials are limited in application.

Another attempt involves preparing a non-woven fiber web, immersing the fiber web in an adhesive in which an adsorbent is dispersed, compressing the web, and drying and solidifying it; or immersing the fiber web in the adhesive liquid, then sprinkling the particles of the adsorbent thereon, and then drying it to fix the adsorbent on the surface of the fiber. This method, however, is costly because of the number of process steps. In the resulting product, the surfaces of the individual adsorbent particles are covered by a film of the adhesive, and the effect of the adsorbent is reduced. Also, there is great loss of pressure when the product is used as a filtering material.

These various defects have not yet been eliminated in spite of the extensive work done in this field.

According to the present invention, there is provided a conjugate fiber of a thermoplastic synthetic organic polymer composed of a high melting polymer component and a low melting polymer component, the latter having a melting point at least 40° C. lower and preferably 50° C. lower than that of the high melting polymer component, and having adhered to its surface finely divided particles of an adsorbent.

The invention further provides fibrous materials such as tows, webs or laps or fibrous articles such as fabrics, textiles or shaped articles consisting of a conjugate fiber of a thermoplastic synthetic organic polymer composed of a high melting polymer component and a low melting polymer component, the low melting polymer component having a melting point at least 40° C. lower and preferably 50° C. lower than that of the high melting polymer component, and having adhered to its surface finely divided particles of an adsorbent.

Generally, the conjugate fiber of the present invention having finely divided particles of an adsorbent on the low-melting component of the fiber is produced by heating a conjugate fiber composed of two thermoplastic synthetic organic polymer components, one of which has a melting point at least 40° C. lower and preferably 50° C. lower than that of the other, to a temperature higher than the melting point of the low-melting component of the conjugate fiber but lower than the melting point of the high-melting component, melt-adhering the finely divided particles of an adsorbent to the low-melting component of the conjugate fiber, and cooling the fiber to thereby solidify particles on the low-melting component.

Similarly, the fibrous materials or fibrous articles of the present invention are formed from the above described conjugate fibers having finely divided particles of an adsorbent adhered to the low-melting component.

The conjugate fiber of the present invention is either a sheath-and-core type or a side-by-side type, and is composed of a high melting polymer component and a low melting polymer component. In the sheath-and-core type, the sheath consists of a low-melting polymer, and the core consists of a high melting polymer. In either embodiment, both components of the conjugate fiber will, of course, be present as continuous phases.

The polymer used for production of the conjugate fiber of this invention is a thermoplastic synthetic organic polymer. Examples of the polymer include polyesters, polyamides, polyolefins, polystyrenes, polyurethanes, polyesteramides, and mixtures thereof.

As the high melting polymer component, there can be used, for example, polyesters such as polyethylene terephthalate, and polyamides such as nylon-6 or nylon-6,6. As the low melting polymer component, there can be used, for example, polystyrenes, polyolefins such as polyethylene or polypropylene, polyvinyls such as polyacrylonitrile or polyvinyl chloride, modified polyesters using as a third component an acid such as isophthalic acid, phthalic acid, adipic acid, or sebacic acid, or a glycol such as trimethylene glycol, hexamethylene glycol, or cyclohexane dimethanol, or polyurethanes.

As the low melting polymer component, a polymer having a melting point at least 40° C. lower and preferably 50° C. lower than that of the high melting polymer should be selected.

In a conjugate fiber of the side-by-side type, the low melting polymer should not be separated from the high melting polymer during a yarn-making process, such as drawing.

As the high melting polymer component, glass fibers or carbon fibers may also be used.

The term "adsorbent", used in the specification and claims, means adsorbents and catalysts which are generally used and can be finely divided. The adsorbent used in the invention includes, for example, active carbon, active clay, active alumina, silica gel, active zeolite, molecular sieve, white carbon, cyclodextrin, ion-exchange resins, metals and metal oxides having a catalytic activity, such as copper, platinum, silver, tin oxide, nickel oxide, zinc oxide, manganese oxide, cobalt oxide, cerium oxide, and mixtures of these.

Figure 2:
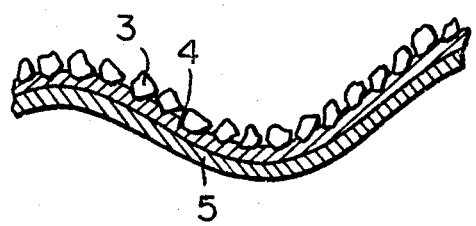

FIGS. 1 and 2 of the accompanying drawings show an example of a conjugate fiber having finely divided particles of an adsorbent adhered to the low melting polymer component of the fiber.

Figure 3:
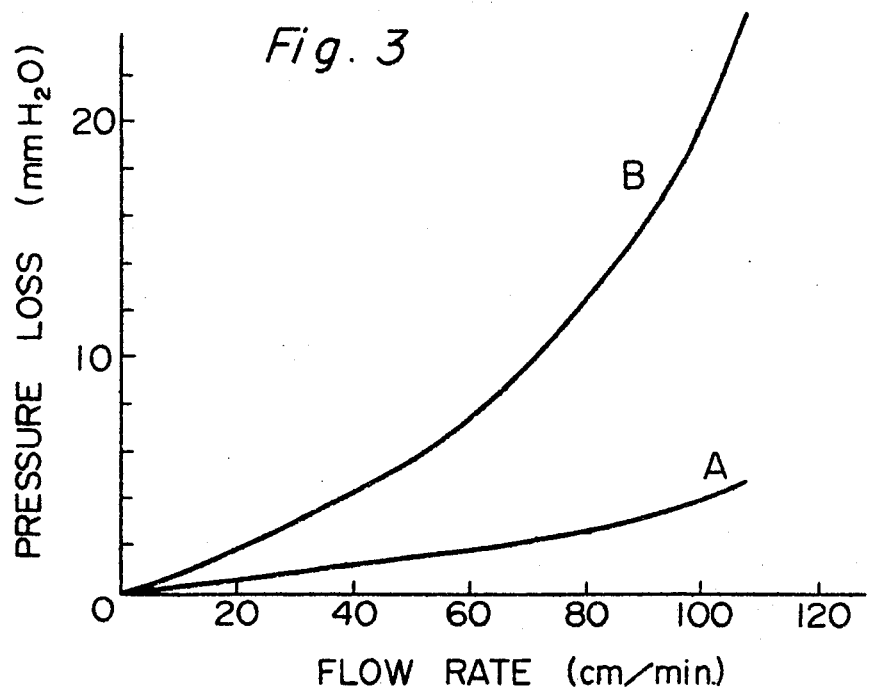
Figure 4:
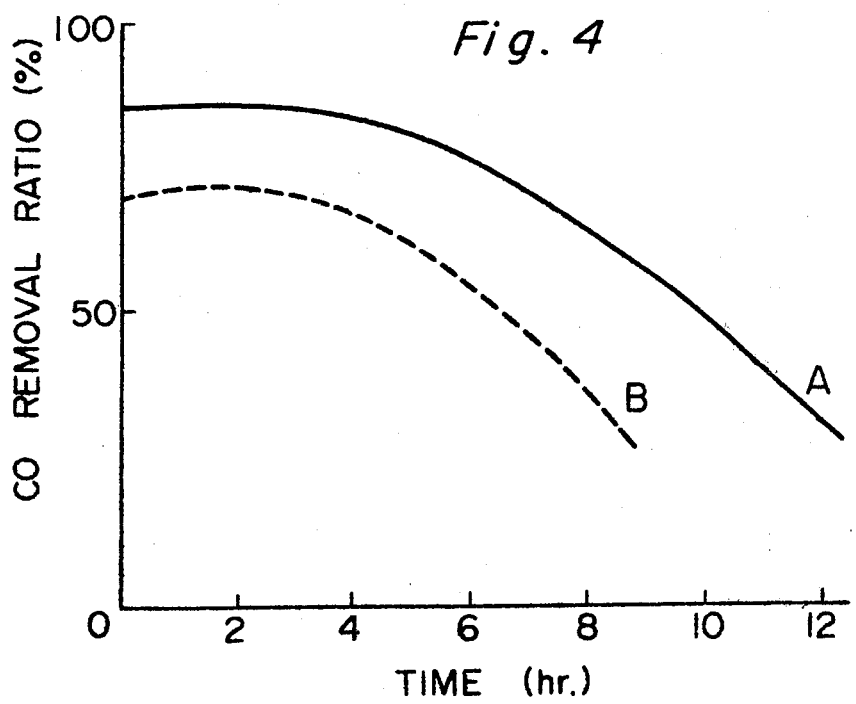

FIGS. 3 and 4 show the adsorption characteristics of the filter of the present invention and an active carbon filter, in which the curve A shows the adsorption characteristic of the filter of the invention as given in Table 6, and curve B shows that of the active carbon filter as given in Table 6.

FIG. 1 is a sectional view of the conjugate fiber of the sheath-and-core type to which active carbon has been attached. The conjugate fiber consists of a low melting component 1 as a first continuous phase which constitutes the sheath, a high melting component 2 as a second continuous phase which constitutes the core and active carbon 3, part of which is embedded and fixed in the low melting component 1. FIG. 2 shows an example of a side-by-side conjugate fiber which consists of a low melting component 4 and a high melting component 5 in which active carbon 3 is partly embedded and fixed during the melting of the low melting component 4.

The present invention will be specifically described with reference to conjugate fibers of the sheath-and-core type, but it should be understood that the same statements will apply to conjugate fibers of the side-by-side type.

The conjugate fiber of the invention should be heated in order to cement adsorbent particles. But if fibers are heat-treated at a temperature above 200° C., the physical properties such as bulkiness, tenacity, or Young's modulus are deteriorated. Moreover, because of an increased tendency for the molten polymer to cover the surfaces of the particles of the adsorbent at higher temperatures, the adsorbing power of the adsorbent is reduced, and a film is also formed on the fiber assembly. Hence, the temperature for melt-adhering an adsorbent should preferably be as low as possible. This is desirable also from the viewpoint of reducing heat loss and thus curtailing the cost of production. Of course, polymers having proper melting temperatures should be selected according to the temperature of the atmosphere in which the filtering material as final product is used.

When a sheath-and-core conjugate fiber containing a polyester polymer having a high Young's modulus as a conjugate component is produced, we have used the polyester as a core component in an amount such that in a cross sectional surface of the fiber, the core component accounts for 40 to 80% of the entire cross sectional area, and as a sheath component, polystyrene which is melt-spinnable and is relatively compatible with the polyester. If the proportion of the core component accounts for more than 80% of the cross-sectional area, the cementing of the adsorbent particles can be accomplished satisfactorily without particular difficulty by carefully selecting the particle size. But since the core component is a low melting polymer, the resulting conjugate fiber has poor bulkiness, and the air-permeability and porosity of the fiber adsorbing material are difficult to obtain. If the core component is less than 40%, a sheath layer to which the adsorbent has been attached becomes thick, and is readily softened and flows upon heating to a temperature above the melting point of the sheath component polymer, which in turn tends to cover the adsorbent and form a film on the fiber assembly. Thus, such sheath component covers the network structure formed by the individual fibers, and reduces the effect of the textile and shaped articles of the invention as a filtering material as a result of reduction in air-permeability and porosity.

The temperature at which the adsorbent is applied to the conjugate fiber will, of course, be higher than the melting point of the low melting component and, in general, should be applied at a temperature ranging from the melting point of the low melting polymer component to a temperature below the melting point of the high melting polymer component. More specifically, it is preferred that the temperature at which the adsorbent is applied to the conjugate fiber not be more than 50° C. higher and most preferably not more than 30° C. higher than the melting point of the low melting component. In addition, it is preferred that the temperature at which the adsorbent is applied should not be higher than 200° C. so as not to reduce the function of the conjugate fiber substantially and so as to apply the adsorbent uniformly. When the temperature exceeds 200° C., the shrinkage of the core polymer, such as polyester, increases; and the Young's modulus of the fiber rapidly decreases, causing irregularities in the application of the adsorbent. At temperatures below the melting point of the low melting component, the adsorbent cannot be firmly fixed to the fiber and the adsorbent falls off from the surface of the fiber assembly, thus losing its inherent function.

The amount of the adsorbent to be adhered to the fiber varies according to the type of the adsorbent used, the utility of the resulting adsorbing material, and the denier size of the support fiber. It is generally known that its adsorbing ability differs according to the effective surface area of the adsorbent, and the adsorbing ability becomes greater with smaller particle sizes of the adsorbent. It is therefore preferred that as fine particles as possible should be adhered, and the adequate amount ranges from 10 to 50%. If too much adsorbent is adhered, the adsorbent comes off during use of the rssulting filtering material.

The conjugated fiber having fixed thereto particles of an adsorbent can be effectively produced for example, by the conjugate spinning method in which a dry heated air containing a suitable and safe amount of the adsorbent is directed to a filament being extruded, at a place 15 to 30 cm from the spinneret face so that the temperature of the filament is above the melting point, thereby to adhere the adsorbent to the filament, and immediately thereafter, the yarn is cooled to a temperature below 80° C. and wound up. Another effective method comprises heating the filament to a temperature above the melting point of the low melting component after spinning and drawing, then blowing an adsorbent against the filament to melt-adhere the adsorbent, and then cooling the filament to a temperature below 80° C.

Also, it is possible to form as-spun and as-drawn filaments into a web, heat the web entirely, spray an adsorbent to the web, pass the web through compression rollers to reduce its thickness to the desired value, and then cool it. An alternative effective method comprises provisionally adhering an adsorbent to a web prior to heating the web, then heating the web, and shaping it. The resulting shaped product can be directly used as a filter, for example.

It is also within the scope of the invention to first prepare woven or knitted fabrics from the conjugate fiber, and afterwards an adsorbent can be adhered to the surface of the woven or knitted fabrics to obtain similar effects.

A product useful as a filtering material can also be obtained by forming the monofilaments of the conjugate fiber into a cloth, and adhering an adsorbent to the surface of the cloth under heat.

In order to render the distribution of the adsorbent more uniform, staple fibers may be spread into a cotton-like form. In this manner, products can be obtained which have increased air-permeability and increased area of contact with a material to be filtered, as a result of increased bulkiness of the fiber owing to latent crimps and the intertwining of fibers by spreading.

When a web-like fiber is used as a material, according to one method, first the web is continuously conducted into a preheating chamber, and heated by circulating hot air so that the entire web is heated to a temperature above the melting point of the low melting component of the conjugate fiber. Then while maintaining that temperature, the finely divided particles of an adsorbent are blown against the web by means of a heated air, and adhered to the surface of the web, followed by cooling the web to room temperature to solidify the particles of the adsorbent. Thereafter, the web is washed with water to remove excessive deposits of active carbon or other adsorbent, and finally dried at low temperatures and wound up.

When active carbon is adhered to the surface of the fiber as mentioned above, it is preferred to heat the fiber to a temperature above the melting point of the low melting component prior to the adhering of active carbon. In order to distribute the adsorbent particles uniformly on the surface of the fiber, it is preferred to sprinkle the adsorbent particles directly on the fiber by a sprayer, or to jet out a mixture of the adsorbent particles with hot air.

In such a conjugate fiber, the weight ratio between the high melting component and the low melting component may be selected such that the proportion of the low melting component is 10 to 90% by weight based on the conjugate fiber as a whole. In order to utilize the characteristic of the fiber fully and to adhere particles of an adsorbent fully, the proportion of the low melting component should preferably be 25 to 50% by weight.

The fibrous material of the present invention is produced by a process which comprises conjugate-spinning two thermoplastic organic synthetic polymers having a fiber-forming ability and differing in melting point by at least 40° C. and preferably by at least 50° C., using a high melting polymer as a core component and a low melting component as a sheath component, to form conjugate filaments in which the core and the sheath are arranged in substantially concentrical pattern, gathering the filaments into a bundle, drawing the bundle so that its shrinkage in boiling water is not more than 70%, spreading the bundle so that the individual filaments do not substantially overlap one another, applying a finely divided adsorbent to the surface of the filaments and among the individual filaments, heat-treating the bundle to a temperature higher than the melting point of the low melting polymer component but lower than the melting point of the high melting polymer component, thereby melt adhering the finely divided adsorbent on the low melting component, and then cooling it to solidify the adsorbent thereon.

The method and apparatus for conjugate-spinning are not particularly limited. In view of the utility of the adsorbing conjugate fiber and the productivity, however, the use of the melt-spinning method is preferred. Any spinning apparatus conventionally used for production of sheath-and-core type fibers is sufficient for the purposes of the present invention. It is preferred, however, that the apparatus should be such that the core component and the sheath component in the resulting conjugate filament are arranged substantially concentrically. If both components are extremely eccentrical, the conjugate filament will be separated into the sheath component and the core component during the drawing step, and fuzzes tend to occur on the filament. Thus, the filament cannot be drawn at a ratio desired to give the specific physical properties, and moreover, finely divided particles of an adsorbent are adhered to the filament nonuniformly. Hence, the eccentric arrangement of the sheath and core components is not desirable.

In the present invention, a plurality of as-spun filaments are bundled, and drawn at a ratio, for instance, of at least 1.2 but not exceeding 5.3. Any method of drawing can be employed which adjusts the shrinkage in boiling water of the filament to not more than 70%. The shrinkage in boiling water of a filament is obtained by immersing the filament in boiling water for 15 minutes, and expressing the amount of shrinkage in percent based on the original length of the filament. If the shrinkage in boiling water exceeds 70%, the finely divided adsorbent is non-uniformly melt-adhered due to shrinkage stress which occurs at the time of heat-treatment. Furthermore, when the resulting adsorbing fiber is shaped in a mold, it is not possible to obtain a product conforming to the shape of the mold because of the residual shrinkage.

The drawn conjugate filament assembly should be uniformly spread into the individual constituent filaments so that they do not substantially overlap one another. The spreading of the filament assembly can be performed by various methods proposed heretofore. One very simple and effective method comprises passing the drawn filament bundle alternately above and below a plurality of fixed pins or hooks arranged in a suitable manner.

The spreading procedure is essential in the present invention before the heat-treatment and the contacting of the filament with the finely divided adsorbent. If the filament bundle is contacted with the finely divided particles of an adsorbent and heat-treated without prior spreading, the adhering of the adsorbent particles is not sufficient since the individual filaments are moved in an overlapping state. Moreover, at the time of heat-treatment, the overlapping filaments melt-adhere to one another with no adsorbent particles therebetween. Thus, microscopically, a film is formed on the filament to prevent the passage of a material to be filtered. It is therefore essential in the present invention to spread the filament bundle.

As the fiber spreading device, shredded rollers (rollers with slits), air jets, apparatus for treating under a relaxed condition, etc. can be used.

The spread drawn filaments are delivered in the spread state from a feed device composed of a group of rollers having contact pressures that overcome the slippages due to the shrinkage stress occurring at the time of heat-treatment, and a fixed amount of finely divided particles of an adsorbent is applied thereto. For example, under a hopper, the finely divided adsorbent is contacted with the spread filament bundle, and immediately then, the filament is passed through a heat-treating device sufficient for melt-adhering the finely divided particles of the adsorbent present among the filaments and on the surface of the filaments while heating the sheath component of the conjugate filament to a temperature above its melting point but not exceeding the melting point of the core component. In the filament assembly so heat-treated, the filaments are substantially not adhered to one another complicatedly, but the finely divided particles of the adsorbent are melt-adhered and fixed on the surfaces of the filaments and among the filaments. Hence, it constitutes an adsorbing fiber having good ability for adsorption and filtration.

The relative positions of the fiber spreading apparatus and feed apparatus are not particularly restricted. But since the provision of the fiber spreading apparatus at the rear of the fiber feed apparatus causes a tension on the filament bundle as a result of friction occurring at the time of fiber spreading and results in insufficient contact between the fiber and the adsorbent particles, it is preferred to position the fiber spreading apparatus in front of the feed apparatus.

The heat-treatment may be performed either under shrinkage or under tension, but preferably should be performed under such a tension as to withstand heat-shrinkage in view of the amount of the finely divided particles of an adsorbent.

The conjugate fiber containing the finely divided adsorbent which has thus been heat-treated is withdrawn by a take-up device. It may directly be packed in an adsorption filter either as such or after being cut to suitable sizes. It may also be shaped to a form convenient for handling by packing it into a mold or winding it up around a form, and used as an adsorption filter.

The fibrous article of this invention is produced by shaping a mixture of a sheath-and-core type conjugate fiber assembly, such fiber comprising a thermoplastic organic synthetic polymer component as a core and another thermoplastic organic synthetic polymer having a melting point at least 40° C. lower and preferably 50° C. lower than the melting point of the core polymer as a sheath component, both components being arranged substantially concentrically; the fibrous article is contacted with finely divided particles of an adsorbent at a temperature above the melting point of the sheath component polymer but not higher than the melting point of the core component polymer, thereby to fix the finely divided adsorbent particles on the surfaces of the filaments and among the filaments. In this shaping operation, a mixture of the composite fiber assembly and the finely divided adsorbent particles is packed in a mold, or wrapped around a material which can maintain it in some form, and shaped at a temperature above the melting point of the sheath component polymer but not higher than the melting point of the core component polymer.

The fixing of the finely divided particles of an adsorbent to the fiber assembly may be performed by mixing them, and then packing the mixture into a mold; or contacting both with each other, and then fixing the finely divided adsorbent particles to the surfaces of the filaments or among the filaments at a temperature above the melting point of the sheath polymer but not higher than the melting point of the core polymer; or packing the fiber assembly into a mold or contacting it with the mold, then adding the finely divided particles of an adsorbent, and contacting the fiber assembly and the adsorbent uniformly by a mechanical method, and fixing the adsorbent to the surfaces of the filaments or among the filaments at a temperature above the melting point of the sheath polymer but not higher than the melting point of the core polymer. In order to contact the shaped adsorbent-containing fibrous article uniformly with the finely divided adsorbent particles, the fiber assembly is packed into, or contacted with, a mold, and annealed at a temperature above a point at which the fiber assembly can shrink substantially and, at the highest, 30° C. above a point at which the sheath polymer begins to be softened. Thereafter, the finely divided particles of an adsorbent are added and can be fixed to the surfaces of the filaments and among the filaments at a temperature above the melting point of the sheath polymer but not higher than the melting point of the core polymer.

The shape of the shaped fibrous article of the present invention can be diversified by the choice of the shape of the mold. The mold may be a cast that is generally used in a foundry, or one that merely maintains a shape. For instance, a mixture of the fiber assembly and a finely divided adsorbent can be wrapped with a wire net.

The fibrous material or fibrous article of the invention can also be produced by a process comprising treating a shaped article consisting of the above described conjugate fiber with a dispersion containing the finely divided particles of an adsorbent; squeezing the material or article until the liquid content is 100 to 700% of the material or article; drying the material or article, heating the material or article to a temperature above the melting point of the low melting component of the conjugate fiber but not higher than the melting point of the high melting component thereby to melt-adhere the finely divided adsorbent particles to the low melting component of the conjugate fiber; and allowing them to cool and solidify.

When the fibrous article is immersed in a liquid, preferably an aqueous dispersion, containing 10 to 40% by weight of the finely divided particles of an adsorbent, the adsorbent particles adsorb the liquid completely, and when the dispersion is allowed to stand, the adsorbent particles flocculate and precipitate. But, for example, in the case of active carbon, the speed of precipitation is considerably low because of its porosity, and therefore, the adsorbent dispersion is uniformly dispersed by a very small exterior action. Hence, the adsorbent can be uniformly adhered provisionally to the immersed sheet-like or block-like fibrous shaped article. By heating the article then, there can be obtained a fibrous article useful as an adsorbing fiber having good filtering properties in which the adsorbent particles are uniformly adhered and fixed.

The finely divided adsorbent is uniformly applied to the fibrous article in an amount of about 10 to 40% by weight in an aqueous dispersion by any known method such as immersion or spraying. Since the adsorbent is uniformly dispersed in water, the adsorbent particles are adhered uniformly to the fibrous article with the effective areas of the fibrous article being covered. If the concentration of the adsorbent particles in the aqueous dispersion falls outside the above specified range of 10 – 40% by weight, the filtering ability of the fibrous article is reduced. The amount of the dispersion of the adsorbent is sufficiently from 5 to 15 times that of the sheet-like or block-like fibrous article in order to achieve the purpose of uniformly adhering the adsorbent in a suitable amount to the fibrous article. The fibrous article is then squeezed until the water content of the article becomes 100 to 700%, to adhere the adsorbent particles provisionally to the fibrous article. If the water content falls outside the above specified range, the adhesion of the adsorbent to the fibrous article is not good.

In order to remove water, the sheet-like or block-like fibrous article containing a large quantity of the dispersion of the adsorbent is squeezed by an apparatus, such as squeeze rollers, which can control the degree of squeezing, to a proper extent according to the thickness of the adsorbing fibrous article, the desired pickup of the adsorbent, and the melt-adhering temperature in the subsequent step. The fibrous article is dried, and then the fibrous article is heated to a temperature above the melting point of the sheath component but not higher than 60° C. above the melting point preferably not higher than 50° C. above the melting point. When water contained in the article is evaporated, it exerts an action of activating the adsorbent.

The fibrous article of the invention in which a plurality of filaments are arranged substantially in one direction is provided by a process which comprises gathering a plurality of sheath-and-core type conjugate filaments composed of a fiberforming thermoplastic organic synthetic polymer component as core and a thermoplastic organic synthetic polymer component having a melting point at least 40° C. lower and preferably 50° C. lower than that of the core component polymer as a sheath into a bundle, causing the finely divided particles of an adsorbent to be present on the surfaces of the filaments and among the filaments, melt-adhering the finely divided adsorbent particles to the filaments at a temperature above the melting point of the sheath component polymer but lower than the melting point of the core component polymer; or fixing the finely divided particles of the adsorbent to the surfaces of the conjugate filaments at a temperature above the melting point of the sheath component polymer but lower than the melting point of the core component polymer, paralleling a plurality of such conjugate filaments, and heat-treating them substantially in one direction, and then shaping the filaments into an article at a temperature above the melting point of the sheath component polymer but lower than the melting point of the core component polymer.

One method of gathering a plurality of conjugate filaments into a bundle according to the invention comprises first gathering a plurality of conjugate fibers into a bundle, then causing the finely divided particles of an adsorbent to be present on the conjugate fibers, and then melt-adhering finely divided adsorbent particles to the surfaces of the filaments and among the filament polymer at a temperature lower than the melting point of the core component polymer, followed by heat-treating substantially in one direction to arrange a plurality of the filaments substnatially in one direction. Alternatively, the finely divided adsorbent particles are first melt-adhered to the conjugate filaments at a temperature above the melting point of the sheath component polymer but lower than the melting point of the core component polymer, then a plurality of such conjugate filaments are paralleled. The filaments are then shaped at the above temperature so that the constituent filaments are arranged substantially in one direction.

In the case of producing a cylindrical adsorbing fibrous article, the individual filaments are bundled so that the filament axes will be in parallel with, for example, the center line of the cylinder, or with a predetermined inclination thereto. In the case of producing a curved tube-like adsorbing fibrous article, a specific direction is imaginarily set within the tube, and the filaments may be arranged along the inner wall of the curved tube, or the entire filament bundle may be twisted in a certain torsion angle. Furthermore, the axis of each of the constituent filaments need not always extend through both end surfaces of the adsorbing fibrous article in a specific direction. For example, in the case of a conical funnel-shaped adsorbing fibrous article, the filaments are arranged so that the axes are directed toward the apex of the cone, and some of these filaments are arranged in parallel with each other in a circular tube which extends from the cone, and made to extend through it. In the present invention, a filament bundle can further be wrapped at a certain angle around a fiber bundle of a plurality of filaments arranged in a certain direction.

Even when the adsorbing fibrous article is molded with the axes of the constituent filaments being placed, it exhibits good filtration effects by the network strucutre of the filaments and good adsorption filtering ability due to the adsorption ability of the finely divided adsorbent. But since the constituent filaments are placed at random, the pressure loss of a fluid to be filtered is larger than that when the adsorbing fibrous article obtained by the process of the invention is used. Hence, the effect of the present invention is especially exhibited when adsorption is performed at high speed.

The ball-like or flock-like fibrous article composed of a conjugate filament having fixed on the surface of the low melting component the finely divided particles of an adsorbent is produced by a process which comprises cutting a conjugate filament composed of at least two thermoplastic synthetic organic polymer components, one of the components having a melting point at least 40° C. lower and preferably 50° C. lower than the melting point of the other, to a length of 0.1 to 15 mm, adding to the resulting assembly of short fibers 5 to 150% by weight, based on the weight of the assembly, of the finely divided particles of an adsorbent, mixing and stirring the short fiber assembly containing the finely divided adsorbent particles to form ball-like or flock-like articles for a long time, heating them to a temperature higher than the melting point of the low melting component but lower than the melting point of the high melting component, and then cooling the articles.

Now, explanation will be given as to a sheath-and-core type conjugate filament composed of polyethylene terephthalate as a core component and polystyrene as a sheath component. A sheath-and-core conjugate tow spun by an ordinary conjugate spinning machine is drawn, and without crimping, cut to a length of 0.1 to 15 mm. Since the fiber length is very short, the resulting staple fibers are not intertwined with one another. The crimping treatment is not particularly necessary, but may be performed without any adverse effect on the process of the invention. The cut length of the fiber should preferably be shorter than those usually employed in the conventional spinning process. Natural cotton has a fiber length of 20 mm to 30 mm, and synthetic fibers have a fiber length of 25 mm to 75 mm prior to processing on a spinning frame. In the present invention, the cut fiber length need be 15 mm to 0.1 mm. Hence, the cohesion of the fibers of the assembly is very low, and the fiber spreading step can be omitted. The assembly of the fibers of short lengths is then mixed with the particles of an adsorbent. For example, it is mixed with about 300 mesh active carbon, manganese oxide or silica gel. The mixing is most conveniently done by a rotary tumbler in order to adhere the adsorbent particles uniformly to the surfaces of the fibers. Depending upon the type of the fiber, the particle size of the adsorbent, and the mixing ratio of the fiber and the adsorbent, the resulting mixture may range from crumbling flocks having a diameter of 1 to 3 mm to ball-like particles having a diameter of 0.3 to 1 cm. These particles are continuously heated so that they do not form a large mass by agglomeration, and heated to a temperature above the melting point of the low melting component of the fiber. The adsorbent particles present on the surfaces of the fibers or among the fibers are adhered by the low melting component polymer of the fiber, and solidified by cooling to a temperature below the melting point of the low melting component polymer. The resulting particles in which the adsorbent particles are bound to the fibers look like granular active carbon when, for example, active carbon is used as the adsorbent, but have distinguishing characteristics in actual applications. These characteristics are:

1. The resulting particles have an apparent specific gravity of 0.08 to 0.2, while active carbon has an apparent specific grantiy of 0.4 to 0.8, and therefore, there is extremely low loss of pressure in use.
2. Because of finely divided carbon, the product is very superior in instantaneous adsorbing ability.
3. The cost of production is low.
4. The packing of the product into an adsorbing tower and its reactivation are easy, and can be performed within a short period of time. Moreover, the cost of regeneration is low.
5. Since the product of the present invention can be remelted, it is possible to shape and heat the fibrous product in various forms and obtain an adsorbing shaped fibrous article easily as desired.
6. The product does not issue noises even when vibrated in a packed state, and therefore is useful for applications in airplanes, automobiles, or ships.

The fibrous material used in this method consists of at least two substances, one of which is an adhesive component having a melting point at least 40° C. lower and preferably 50° C. lower than the other component, and may be either a sheath-and-core type (either eccentrically or concentrically arranged) or a side-by-side type fiber. Generally, bi-component fibrous materials are most useful for industrial application. The optimum components of the material are selected according to the type of the adsorbent used, the atmosphere in which the resulting material is used, for instance, the temperature at which it is used. One example is shown below.

Table 1

| Combinations of constituent fibrous materials | | |
|---|---|---|
| Temperature at which the adsorbing filtering material is used | Component A (non-melting component) | Component B (melting and adhesive component) |
| Room temperature to around 100° C | Poly-epsilon-caprolactam | Polyethylene Polypropylene |
| High temperature (about 100-200°C.) | Polyethylene terephthalate Polyhexamethylene adipamide Polyethylene naphthalate Glass fiber Carbon fiber m-phenylene isophthalamide | Poly(methyl acrylate) Nylon 6/nylon 66 copolymer Polyurethane Poly(omega-amino-undecanoic acid) Polystyrene |

The components of a bi-component conjugate fiber should be chosen in consideration of the temperature at which the adsorbing filtering material as a final product is used. In other words, both components should have a melting point above the temperature at which the filtering material is usually employed, and component A should have a melting point at least 40° C. and preferably at least 50° C. higher than the melting point of component B.

The arrangements of the two components in the bi-component conjugate fiber may be varied. One example is a uniform mixture of the two components. For example, a mixture of poly-epsiloncaprolactam and 80% by weight of polyethylene terephthalate is melt-spun at 270° C., whereby the former is arranged as acicular islands in the sea of the latter uniformly along the fiber axis. This fiber can be activated by heating to 230° C. which is above the melting point of poly-epsilon-caprolactam, and poly-epsilon-caprolactam exhibits effects as an adhesive component. A side-by-side type conjugate fiber or a sheath-and-core type conjugate fiber can be obtained by extruding two components to the spinneret from separate feeding devices. In the case of the sheath-and-core arrangement, the sheath component should have a melting point at least 40° C. lower and preferably 50° C. lower than the melting point of the core component. Furthermore, both components should have the property of being able to be conjugate spun. The sheath-and-core type conjugate fiber can be obtained by a method other than spinning, such as, for example, resin finishing, wherein a web composed of a single polymer component is immersed in a solution or dispersion of a sheath-component polymer, followed by drying to give a bi-component fiber in which the sheath component is thinly coated on the surface of the core component. According to this method, the polymer constituting the sheath component should not necessarily have a fiber-forming ability, and the melting points or decomposition points of both components may be different from each other by more than 150° C.

Furthermore, if the number of coatings is increased using different kinds of polymer, a conjugate fiber having three or more components can be readily obtained.

The most feasible and economical way is to form a sheath-and-core type bi-component conjugate fiber by the spinning method. The proportion of the core component should be at least 45%, preferably at least 50% and up to 85%. In order to retain the shape of the fiber when the fiber is formed into cotton-like or flock-like articles, the proportion of the core component should preferably be at least 50%.

The method of producing ball-like or flock-like adsorbing filtering materials will be described in detail below.

Generally, spun fibers have intertwining because of their crimps and some length, and as an assembly, exhibit a cotton-like bulky form. By shortening the fiber length gradually, the intertwining among the fibers is gradually reduced. Spun fibers in general have a length of at least 20 cm, because the degree of intertwining among the fibers greatly affects the properties, especially tenacity, of the spun yarns. For use as the material of the present invention, the fibers should have a length of 0.1 to 15 mm, preferably 2 to 7 mm. Fibers with this fiber length are hardly intertwined with one another, and exhibit behavior and appearance near those of powders. When an assembly of these short fibers is mixed and stirred in a rotary mixer such as round meter or tumbler, it gradually forms small pills with a diameter of 1 mm to 1 cm. Fibers such as nylon, polyester, or polypropylene fibers which readily form pills even during apparel use will form pills in relatively short periods of time, but such fibers as acrylic fibers, acetate fibers, or rayon fibers which hardly form pills during apparel use will have difficulty in forming pills by tumbler treatment. The cause of this is not known. Experiments however show that fibers obtained by melt-spinning are more readily formed into pills than those obtained by dry or wet spinning. Ball-like articles can be more quickly formed when the fibers are crimped. When the particles of an adsorbent are added during the step of stirring the short fibers by a tumbler, the adsorbent particles are mixed with the fibers and are adhered uniformly to the surfaces of the fibers. The short fibers form ball-like particles while having the adsorbent particles adhered to their surfaces. With further progress of the mixing operation, the ball-like particles include the adsorbent particles therein, and the adsorbent particles are retained not only on the surfaces of the fibers but also among the individual fibers. Next, the interior of the rotary cylinder of the rotor is heated to elevate the temperature of the low melting component of the fiber to a point above its melting point. The adsorbent particles are melt-adhered to the surfaces of the fibers and among the fibers. The temperature is then decreased to below the melting point of the low melting component thereby to fix the adsorbent particles completely. During the heating and cooling steps, the ball-like particles may be retained in a stationary state. It is, however, better to rotate and mix them continuously in order to prevent the agglomeration of the ball-like particles into a large mass. Furthermore, by rotating and mixing the ball-like articles at high temperatures, the adsorbent particles are freshly adhered to the ball-like articles.

The amount of the adsorbent to be added to the fiber varies according to the size of the adsorbent particles. If the size of the adsorbent particles is too large, the adhesion of the adsorbent to the surface of the fiber is reduced, making it difficult to form pill-like articles smoothly. Hence, the adsorbent particles should have a size of more than 100 mesh, preferably more than 200 mesh.

The amount of the adsorbent is generally in the range of 5 to 150% by weight based on the weight of the resulting adsorbent-containing fiber, preferably 10 to 80% for stable operation.

The fibers, fibrous materials and fibrous articles of the invention described above have the following advantages.
1. They can be readily shaped.
2. They can be shaped in any desired shape.
3. Fiber assembly of any form can be used.
4. Since the product undergoes little resistance upon passage of a material to be filtered, the vessel to be used may be of lesser strength.
5. The product adsorbs foreign matter in a fluid to be filtered both physically (or chemically) and effeciently, and has a very good adsorbing ability.
6. The product permits a strong filtration of foreign matter present in a fluid to be filtered.
7. Operations such as packing the product into a vessel can be performed simply.
8. The fixing of the adsorbent particles to the fibers is so strong that the particles do not come off, thus ensuring cleanliness during handling.
9. Since no particular adhesive is used to fix the finely divided particles of an adsorbent to a fibrous assembly, the resulting product can be used in the field of foodstuffs and medical treatment.

Because of the wide variety of advantages mentioned above, the flock-like or pill-like articles of the invention containing the finely divided particles of an adsorbent have a wide range of application. Examples of typical uses include:

1. Gas mask

In the field of gas masks, the product of the invention exhibits superior characteristics to the conventional granular active carbon. This is ascribable to the fact that it has a large specific volume and hence a small pressure loss, and a large initial adsorbing property, and that it does not easily permit by-passing.

2. Deodorant for vehicles

The product can find applications as deodorants for use in air-planes, automobiles, ships, or space ships, and has eliminated the defects of granules of coconut husk activated carbon, for example, which is designated by NASA. These defects are:
 a. Uncomfortable noises occur by the contacting of the carbon particles during use in a vibrating place.
 b. The specific gravity is relatively high (0.4 – 0.8).
 c. The adsorbing effect is exhibited slowly. Granular carbon has a small apparent surface area, and time is needed for the material to reach the micropores inside the granules.

3. Industrial air filter

For treatment of exhaust gas from factories, both dusts and large quantities of organic solvents or material having offensive smell must be treated. Hence, a two-step treating method has previously been practiced. Specifically, fine dusts are filtered by a filter of a fiber web, and then a layered filter of granular activated carbon put in a wire gauze is used to adsorb the foreign matter. By the application of the adsorbent-containing fiber of the invention, a one-step treatment has become possible. In application, the ball-like adsorbing fiber is simply packed in a case conventionally used for fiber filter. If the filter is of a vertical type lacking a supporting wire gauze, the adsorbing fiber of the present invention is packed in a mold of the size of the conventional filter, and by heat-treatment, the low melting component is melt-adhered to obtain a rigid shaped filter, which can be directly used as a vertical type filter. The filteration and adsorption ability of the finished article is more stable to vibration than a filtering material obtained by merely packing the adsorbent in granular shape, and the article is easier to handle. The adsorbing ability is high, and pressure loss is low.

4. Removal of traces of dangerous substances

It is extremely difficult to remove traces of radio active substances such as cesium 137 or strontium 90 contained in the atmosphere or BHC contained in milk or heavy metal compounds in sea water. Since the ball-like adsorbing fibers of the present invention come into very effective contact with a fluid, it is possible to catch traces of substances very effectively, and the adsorbing part can be designed in a very compact size.

5. Water-cleaning device

The ball-like adsorbing fiber articles have an apparent specific gravity of 0.2 to 0.08. Hence, pressure loss is remarkably low, and becomes about one-fifth to one-third of that of the conventional adsorbing filter materials. The structure of a water-cleaning device, for example, a home water-cleaning device, may be very simple, and it is light in weight.

It can be used in a simplified water-cleaning vessel that can be carried on picnics, for example. Complete water cleaning effect can be obtained by combining active carbon and an ion-exchange resin as an adsorbent.

In addition to applications as filters, the shaped articles of the present invention can be used widely for removing finely divided foreign matters from mineral oils, deodorizing warehouses and home refrigerators, bleaching in cleaning, or removing $SO_2$ or $CO$ from exhaust gas in automobiles, and also as tobacco filters.

If various adsorbents are used in mixture, it is possible to adsorb different materials selectively.

The invention will now be described with reference to the following Examples.

EXAMPLE 1

When conjugate-spinning polystyrene having a melting point of 150° C. as a sheath and polyethylene terephthalate having a melting point of 250° C. as a core, the ratio of the sheath to the core extruding was adjusted to 1 to 4, and wound up at a rate of 1,000 m/min. by a spinneret having 24 holes with a diameter of 0.3 mm so that the denier size of the undrawn yarns may become 480 denier. The undrawn yarns were gathered to prepare a two of 48,000 denier and this two was then drawn 4 times the original length at a temperature of 120° C. The drawn two was heated to 160° C. so that the temperature of the tow may become 152° C. and was wound up at a rate of 50 m/min. thereby blowing active carbon at a rate of 17 g/min under the dry heating of 150° C. The tow was then cooled quickly so that its temperature may become below 80° C. and thus particles of active carbon were adhered to the surface of the fiber.

Observation of individual crimped filaments of a conjugate-fiber by means of a microscope showed that the polystyrene of the sheath component was largely melt-adhered and particles of active carbon were melt-adhered and fixed to every part of the surface of the individual filaments. It was further observed that the individual filaments were melt-adhered to the neighboring filaments forming a three-dimensional network structure. This tow was cut two inches long and opened to a cotton-like material, 15.6 g of which was charged to a cylinder to 5 cm in diameter and 10 cm long in order to pass through the cylinder the $SO_2$ gas of 5 ppm concentration at a flowing velocity of 2 m/sec for one minute. Measurements of concentration of the gas passed through the cylinder indicated an adsorption rate of 89.3%.

EXAMPLE 2

When conjugate-spinning polycapramide having a melting point of 220° C. as a sheath and polyethylene terephthalate having a melting point of 260° C. as a core at a rate of their extruding amount of 2 to 3 by using a spinneret having 36 holes with a diameter of 0.3 mm, superheated vapor containing active carbon in a safe amount was blown to the extruded conjugate fiber at a position 5 cm from the outermost periphery of the fiber at an angle of 2° degree downward with respect to the horizontal direction and 23 cm below the surface of the spinneret, in order that the temperature of said filaments may be raised to 224° C., and further controlling the blowing amount so that 18% by weight of active carbon may be melt-adhered to the filaments and still further the filament groups were rapidly cooled at a position 10 cm below the blowing position in order to lower the temperature of the filament groups to 70° C. for the purpose of adhering the active carbon particles to the surface of the filaments which are being wound at a rate of 1000 m per minute. The denier of the individual filaments of the wound undrawn yarn was 25 denier. This undrawn yarn was drawn 3.98 times of the original length at a temperature of 120° C. This yarn was subjected to the relaxation heat process under the conditions of 180° C. of drawing temperature, and the crimping rate of 24% to obtain the crimped filament consisting of individual 7.8 de yarns. The obtained crimped filaments were knitted and 12 g of the crimped filaments were charged to a cylinder in the same way as in Example 1. The measurement showed that 80.3% of $SO_2$ gas was adsorbed.

EXAMPLE 3

3.2 Kg of fiber material composed of a conjugate fiber to which is melt-adhered active carbon having an adsorbing ability, was charged to a cylinder having a cross-sectional area of 45 sq. cm by 50 cm high. By varying the flowing velocity, the pressure loss and adsorbing ability of this invention for $SO_2$ gas were compared with those of coconut grain active carbon having particles sizes of 30 – 48 mesh and a packed specific gravity of 0.5. The results were as listed in Table 1.

Table 1

| | $SO_2$ gas adsorbing ability (%) | | | | pressure loss (mmH$_2$O) | | | |
|---|---|---|---|---|---|---|---|---|
| $SO_2$ gas (5 ppm) flowing velocity (cm/sec) | 10 | 20 | 30 | 40 | 10 | 20 | 30 | 40 |
| coconut grain active carbon | 81 | 75 | 50 | 45 | 30 | 82 | 149 | 266 |
| the fibrous material of this invention | 89 | 80 | 53 | 44 | 10 | 32 | 41 | 101 |

EXAMPLE 4

Polycapramide having a melting point of 215° C. and polyethylene terephthalate having a melting point of 260° C. were conjugate-spinned to prepare conjugate fibers of the side-by-side type and were drawn four times of the original length at a temperature of 130° C. to prepare a yarn having a denier size of 100 de/25 filament. Using this yarn a fabric of 235 g per sq. meter was prepared. This cloth was heated to 220° C. and to the heated cloth there was uniformly adhered finely divided active carbon particles to a density of 0.02 g per sq. cm and the cloth was then cooled so that the surface temperature of this fabric was lowered to below 80° C. After washing with water and dried, four sheets of this fabric were placed upon another to prepare a sheet of 1.5 mm thick under a pressure of 5 kg per sq. cm. This thick fabric was cut into circular shape (5 cm in diameter) and twelve pieces of which were piled and packed in a cylinder of 5 cm in diameter by 10 cm long and through which cylinder was passed $SO_2$ gas of 5 ppm concentration at a flowing velocity of 2 m per min. for one minute. The measurements of the resulting gas showed that 91.3% of $SO_2$ gas was adsorbed.

The adsorbing abilities of the fibrous adsorbers in Examples 5 and 6 below were found by packing a suitable amount of adsorbers into a cylinder of 5 cm in diameter by 10 cm long, thus measuring the increase of weight of the adsorber through which is passed dry air containing 0.15 of acetone per liter at a rate of 2,000 cc per minute for a certain period of time.

EXAMPLE 5

Using polystyrene having a melting point of 151° C. as a sheath component and polyethylene terephthalate having a melting point of 259° C. as a core component, and controlling the extruding amount so that the core component occupied 70% of the cross-sectional area of the fiber, the conjugate-spinning was carried out at a rate of 1,000 m per minute with a spinneret with a diameter of 0.3 mm having 36 holes.

A conjugate fiber having active carbon particles adhered to its surface was obtained by allowing dry air heated at 160° C. to contain active carbon particles (particle size, 325 mesh) such that the carbon particles were blown out at a rate of 6 g per minute, and by blowing such air to the extruding filaments at right angles at a position 20 cm below the surface of the spinneret. The yarns were drawn three times of the original length at a temperature of 125° C. and then shrunk by 10% at 140° C. The conjugate fiber having the number of crest of 10 T/cm being crimped and having active carbon particles adhered to its surface was thus obtained. Adsorbing abilities for acetone gas for the following three fibers, i.e., the fibers open to cotton-like material (A), made to knitted goods (B) and bundled to skein form (C) were measured. The results were as shown in Table 2.

In Table 2, the comparative test was made using active carbon particles only in an amount equivalent to that used with sample (A).

Table 2

|  |  | amount of active carbon adhered to fibers (wt% to fibers) | adsorbing ability (%) |
|---|---|---|---|
| this invention | A | 23.6 | 26.4 |
|  | B | 20.2 | 20.1 |
| comparative test | active carbon | — | 14.8 |

EXAMPLE 6

Polyethylene having a melting point of 151° C. as a sheath component and polyethylene terephthalate having a melting point of 259° C. as a core component were conjugate-spinned with the weight ratio of core to sheath components set at 50 to 50 and then drawn to three times of the original length at 165° C. and shrunk by 15% under heat treatment and then formed to a 10 mm thick web. The web was heat-treated so that the temperature of the web became 180° C. Manganese oxide particles (average size, 10 micron) were then uniformly adhered to the surface of the conjugate fibers of the web. The passage of sulfuric acid gas instead of acetone gas (which was used in Example 5) through the fibrous adsorber (web) shows that 95% of sulfuric acid gas was adsorbed.

EXAMPLE 7

Polystyrene having a melting point of 151° C. as a sheath component and polyethylene terephthalate having a melting point of 261° C. as a core component were conjugate-spinned and drawn and then formed into a block-like molding. This fibrous molding was immersed in an aqueous dispersion liquid containing 35% of active carbon particles (particle size, 325 mesh), and compressed so that water contained in said fibrous molding may become 300%, followed by the melt-adhesion treatment at 180° C. for 40 minutes. The fibrous adsorber thus prepared appeared to allow on its surface 33.8% of active carbon particles (particle size, 325 mesh) melt adhered. The fibrous adsorber was divided into eight equal portions. Using a solvent, active carbon was removed from the fiber surfaces of each portion to determine the content of active carbon particles of each portion. The results showed that the difference of contents, i.e., between maximum and minimum was 0.5%, thus proving very uniform melt adhesion. Packing the resulting fibrous adsorber into a cylinder and permitting water containing 2 ppm of chlorine to flow through the cylinder at a rate of 2 l. per min. for five hours indicated the chlorine concentration in the filtrate to be 0.02 ppm, as calculated by the orthotolidine method.

EXAMPLE 8

The block-like fibrous molding used in Example 7 was immersed in water containing 28% of silica gel particles with a particle size of 200 mesh (a mixture of 2% of $Al_2O_3$ and 98% of $SiO_2$) and compressed so that water in the fibrous molding became 400%, followed by melt-adhesion treatment at 180° C. for 40 minutes. The fibrous adsorber thus prepared appeared to allow 21% by weight of silica gel particles (particle size, 200 mesh) melt-adhered on the surface. The fibrous adsorber was divided into ten equal parts to measure the content of silica gel particles in the fibrous adsorber. The results showed the differences between maximum and minimum amounts to be 0.3%. The fibrous adsorber was vacuum dried at 80° C. for 2 hours. 100 g of this fibrous adsorber adsorbed 3.6 g of moisture from air of a relative humidity of 60%.

EXAMPLE 9

Using polystyrene having a melting point of 151° C. as a sheath component and polyethylene terephthalate having a melting point of 259° C. as a core component and adjusting the rate of the sheath to core component to 50:50 on a weight basis, and also maintaining conditions so that the cross-section of the fiber may take a form of a concentric circle, the conjugate-spinning and the draw were performed. The drawn filament was then cut to 51 mm long, and packed into the metal molding of the "collarless hat type" to which was added fine granular active carbon particles (particle size, 325 mesh), and the resulting mixture in the metal molding was then heated in a heated-air dryer at 180° C. for ten minutes. The molded fibrous adsorber with a size of 150 mm long, 24 mm in inner diameter and 75 mm in outer diameter, was obtained. The molded fibrous adsorber containing 32.2% by weight of active carbon particles was charged into a vertical type filter in order to allow the flow of air containing 10 ppm of $SO_2$ gas at a rate of 2 liters per minute for one hour. The calculation showed that the $SO_2$ concentration present in air passed through the adsorber to be 0.2 ppm.

EXAMPLE 10

With use of the same polymers as employed in Example 9, the conjugate spinning and drawing was conducted so that the core and sheath components would conjugate together at a weight ratio of 60:40 to form conjugate filaments in which the core and sheath components had concentric sections. The resulting tow of conjugate filaments was suitably spread, and finely divided active carbon (size of 325 mesh) was sprinkled over the spread tow, following which the tow was wound uniformly around a steel rod of a 50 mm diameter along a length of 100 mm and the heat treatment was conducted at 180° C. for 20 minutes. A molded fibrous hollow adsorbent on the periphery of which convexities and concavities were formed by shrinkage of fiber aggregates. In such molded fibrous adsorbent, the area for contact with a fluid to be filtered was increased by the presence of such perripheral convexities and concavities, and therefore, the product was very effective as an adsorbent.

EXAMPLE 11

By employing polyethylene having a melting point of 131° C. as a sheath component and polyethylene terephthalate having a melting point of 259° C. as a core component, the conjugate spinning and drawing was conducted so that the core and sheath components would conjugate together at a weight ratio of 50:50 to form conjugate filaments in which the core and sheath components had concentric sections. The resulting tow was cut into pieces of 51 mm and blended with powdery active silica gel (a mixture of 2% of $Al_2O_3$ and 98% of $SiO_2$) having a size of 100 mesh. The blend was packed in a mold similar to that used in Example 9 and the heat treatment was conducted at 165° C. for 12 minutes. The temperature was lowered to 70° C., and the molded product was taken out from the mold, following which excessive silica gel was removed. There was thus obtained a molded fibrous adsorbent similar to the product obtained in Example 9. One hundred grams (100 g) of this molded fibrous adsorbent could adsorb 4.1 g of water from air of a relative humidity of 58%. The activity of the adsorbent was regenerated by heating (activating) it at 80° C. for 3 hours after its use. The so formed adsorbent could be charged into a vessel of a foodstuff or drug as a drying agent.

EXAMPLE 12

The conjugate spinning was conducted by employing polystyrene having a melting point of 151° C. as a sheath component and polyethylene terephthalate having a melting point of 259° C. as a core component so that the sheath and core components would conjugate together at a weight ratio of 50:50 to form conjugate filaments in which the sheath and core components had concentric sections. The filaments were wound up and then drawn. The drawn filaments were gathered into a tow of 22,000 denier and the tow was drawn at a stretch ratio of 3.0. The shrinkage in boiling water of the drawn tow was 48%. The tow was opened and then finely divided active carbon was sprinkled over the opened tow, following which the tow was subjected to heat treatment at 200° C. by means of a contact plate under such conditions as keeping the tow length constant. The resulting tow-like fibrous adsorbent contained 23% by weight of active carbon. When 8 g of the adsorbent was packed into a cylindrical filter having a diameter of 5 cm and a length of 10 cm and 100 liters of water containing 1.5 ppm of chlorine was passed through the filter at a flow rate of 400 cm/min, the chlorine concentration in the filtrate was determined to be 0.12 ppm by the colorimetric analysis using orthotolidine.

Separately, the tow-like fibrous adsorbent was cut into 5 cm and packed into a metallic cylinder having an inner diameter of 5 cm and a length of 8 cm. Then the heat treatment was conducted at 180° C. for 10 minutes and the resulting molded adsorbent was taken from the cylinder. When it was packed into the above cylindrical filter and the adsorption test was conducted in the same manner as above, the concentration of chlorine remaining in the filtrate was determined to be 0.15 ppm.

EXAMPLE 13

The conjugate spinning and drawing was conducted in the same manner as in Example 12 except that polypropylene having a melting point of 172° C. was employed as a sheath component. After the resulting tow was opened, finely divided silica gel (a mixture of 2% of $Al_2O_3$ and 98% of $SiO_2$) was sprinkled over the opened tow. Then the tow was heated at 220° C. by means of a contact plate, and excessive silica gel was removed to obtain a tow-like fibrous adsorbent, 100 g of which could adsorb 3.8 g of water from air having a relative humidity of 58%.

EXAMPLE 14

Five grams of the tow-like fibrous adsorbent obtained in Example 12 was packed into a cylindrical tube of a 5 cm diameter, and air was passed through the tube at a rate of 2 liters per minute, from the upper portion of the tube. Separately, 1.25 g of active carbon was packed into the same tube and air was passed therethrough under the same conditions. The pressure loss observed in the case of the fibrous adsorbent was 1/250 of the pressure loss observed in the case of active carbon. Thus it was found that in the fibrous adsorbent of this invention the passage resistance was much lower than in the active carbon adsorbent.

EXAMPLE 15

The conjugate spinning and drawing was conducted by employing polyethylene terephthalate having a melting point of 259° C. as a core component and polystyrene having a melting poing of 151° C. as a sheath component, the weight ratio of both the components being 50:50. The size of the resulting monofilament was 1.0 denier. The so formed filaments were gathered into a tow of 100,000 denier, and the tow was cut into pieces of 7 mm ± 2 mm. Then 200 g of the cut pieces which were in the completely opened state were charged into a lateral rotary drum having a diameter of 30 cm and a length of 25 cm together with 150 g of active carbon of 325 mesh obtained from coconut husk. The agitation was effected at a rate of 36 rotations per minute for 60 minutes. Thus, 80% of the content was converted to granular masses of a diameter of 3–7 mm. When the agitation was furthered for another 30 minutes, almost all of the filament pieces were formed into beads. Then, the content of the drum was heated under rotation, and the heat treatment was conducted at 180° C. for 20 minutes. The temperature was gradually lowered to 70° C. while the rotation was being continued. Thus, there were obtained black beads resembling pills. The carbon black was distributed uniformly from the outer portion to the interior in each bead, and fixed tightly on the filament surfaces and interposed among filaments. The so formed granular fibrous adsorbent of this invention had an apparent density of 0.092 and contained 42% by weight of active carbon. This granular fibrous adsorbent was packed into a water purifier of a flask-form having a capacity of 810 ml, and its adsorbing activity was tested and compared with activities of granular active carbons and other similar product. Results are shown in Table 3.

From experimental data shown in Table 3, it will readily be understood that when the product of this invention is applied to a water purifier for household use, it exhibits a high chlorine-adsorbing activity with a low pressure loss.

EXAMPLE 16

A purifier of a flask-form similar to that employed in Example 15 was packed with 75 g of the adsorbent obtained in Example 15, and air containing 10 ppm of sulfurous acid gas was passed through the purifier at a rate of 20 liters per minute for 30 minutes. As a result, sulfurous acid was adsorbed at an adsorption ratio of 99.9%.

EXAMPLE 17

Seventy five grams of the granular fibrous adsorbent obtained in Example 15 was taken into a cylindrical mold having a 6 cm diameter and a 30 cm height, and the mold was sealed. Then, the heat treatment was conducted at 180° C. for 15 minutes, and the temperature was lowered to room temperature to obtain a molded adsorbent having a cylindrical form. The adsorbent was inserted into a glass tube having a similar form, and city water containing 0.22 ppm of chlorine was passed through the tube from one end thereof at a rate of 5 liters per minute. After passage of 100 liters of water, purified water contained only 0.01 ppm of chlorine, and after passage of 2 tons of water, the chlorine content of purified water was 0.02 ppm.

In view of the foregoing, it will readily be understood that the product of this invention can exhibit similarly an excellent adsorbing activity, whether it is used in the Table 3

| Configuration | Adsorbent of this invention | Similar Product | Granular active carbon |
|---|---|---|---|
| | granules having 5 – 7 mm diameter | long strips obtained by cutting product formed by impregnating commercially available non-woven fabric with mixture of active carbon and resin and drying impregnated non-woven fabric | commercially available active carbon of 8 – 14 mesh |
| Amount Packed into Water Purifier (g) | 75 | 82 | 300 |
| Pressure Loss (mmHg) | | | |
| 2 liters per minute | 37 | 208 | 380 |
| 6 liters per minute | 145 | 340 | 532 |
| 10 liters per minute | 342 | 480 | 760 |
| Water-Purifying Effect | | | |
| remaining chlorine content (ppm) after passage of 1 liter of water | 0.00 | 0.10 | 0.05 |
| remaining chlorine content (ppm) after passage of 20 liters of water | 0.00 | 0.04 | 0.02 |
| remaining chlorine content (ppm) after passage of 100 liters of water | 0.01 | 0.11 | 0.04 |

* water before purification contained 0.22 ppm of chlorine.

form of beads as in Example 15, or when it is used after it has been molded under heat.

EXAMPLE 18

A polyethylene terephthalate tow having a total denier of 100,000 and a monofilament denier of 1.5 was opened by means of ordinary grooved rolls and air jet, and then dipped into a 20% solution of polystyrene in benzol. The tow was squeezed so that the solution was applied onto the tow in an amount of 40% by weight, and dried at 65° C. The resulting tow was opened again and cut into 5 mm lengths by means of a cutter, and the granulation treatment was conducted in a tumbler under the same conditions as in Example 15 by employing active carbon. The resulting bead-like adsorbent contained 16% of active carbon. A cylinder of a diameter of 5 cm was packed with 100 g of the so obtained adsorbent, and air containing 3 ppm of carbon tetrachloride was passed through the cylinder at a rate of 5 liters per minute. After passage of 1000 liters of air, the carbon tetrachloride concentration in the purified air was 0.1 ppm.

EXAMPLE 19

A silica gel-containing bead-like adsorbent was prepared by a method similar to that described in Example 15 by employing the same conjugate filaments as used in Example 15 and particles of silica gel (mixture of 98% of $SiO_2$ and 2% of $Al_2O_3$) having a size of 200 mesh as an adsorbing agent.

The so obtained adsorbent contained 28% by weight of silica gel and 100 g of the adsorbent could adsorb 3.8 g of water from air having a relative humidity of 52%.

EXAMPLE 20

The conjugate spinning and drawing was conducted in the same manner as in Example 1 by employing polyethylene having a melting point of 132° C. as a sheath component and polypropylene having a melting point of 185° C. as a core component. The drawn yarn was cut into 5 mm lengths and 200 g of cut filaments were charged into the same lateral heating drum as used in Example 15 together with 180 g of finely divided Molecular Sieve A5 (product of Union Carbide Corporation). They were blended for 40 minutes by rotating the drum at a rate of 52 rotations per minute. Since a plurality of fibrous beads were formed by the above treatment, the temperature was raised to 140° C. while the rotation was being continued, and this temperature was maintained for 20 minutes, whereby the adsorbing agent particles were melt-adhered to filament surfaces and fixed among filaments to form a bead-like fibrous adsorbent. A cylindrical vessel having a 5 cm diameter was packed with 1 kg of the so formed adsorbent, and a benzene solution containing 5% of n-tetradodecane was allowed to flow down through the vessel. Thus, there was obtained benzene of a purity of 99.9%.

EXAMPLE 21

Conjugate filaments were prepared by conducting the conjugate spinning and drawing according to a customary method with use of polyethylene having a melting point of 132° C. as a sheath component and polycaproamide having a melting point of 220° C. as a core component. 70,000 of the so obtained drawn filaments were gathered to form a filament bundle, and active carbon having a size of 325 mesh was sprinkled over the bundle. Then the bundle was molded at 150° C. under a tension of 0.1 g/d to obtain a column of a 60 mm length (molded fibrous adsorbent A). Separately, the above drawn filaments were cut into 1.5 inch lengths, and blended with the same active carbon as above. The blend was packed into a mold and the molding was conducted to obtain a molded article having the same configuration as that of the molded fibrous adsorbent A (molded fibrous adsorbent B). Air was passed through the above molded fibrous adsorbents A and B and the same active carbon as used for preparing these adsorbents, and they were compared with one another with respect to the pressure loss. Results are shown in Table 4. The amount of active carbon used in the experiment was the same as that contained in the molded fibrous adsorbent.

Table 4

| Adsorbent | Active Carbon content (% by weight) | Pressure Loss (mm $H_2O$) Flow Rate | | | | | | |
|---|---|---|---|---|---|---|---|---|
| | | 0.1 m/min | 0.5 m/min | 0.8 m/min | 1.3 m/min | 2.5 m/min | 4.2 m/min | 6.2 m/min |
| Molded Fibrous Adsorbent A | 35 | 2 | 4 | 7 | 12 | 27 | 47 | 83 |
| Molded Fibrous Adsorbent B | 35 | 2 | 5 | 10 | 23 | 62 | 142 | 213 |
| Carbon Black Alone | | 12 | 34 | 74 | 98 | 198 | 348 | — |

As is seen from the results shown in Table 4, the cylindrical fibrous adsorbent A prepared according to the process of this invention exhibited a very low pressure loss and was very effective especially when a gas or fluid was passed at a high flow rate.

EXAMPLE 22

Conjugate filaments were prepared by conjugate spinning 40 parts by weight of polystyrene having a melting point of 151° C. and 60 parts by weight of polyethylene terephthalate having a melting point of 259° C. so that the former polymer would surround the latter polymer and drawing the spun filaments. The filaments were fused at 200° C. under stretch of 28% and carbon black having a size of 325 mesh was attached to the molten surfaces of the filaments. Then the active carbon-attached filaments were gathered and arranged in an aluminum cylinder having an inner diameter of 48 mm and a length of 78 mm so that the axis of each filament would be parallel to the central axis of the cylinder, and then the molding was effected at 210° C. for 20 minutes. The molded product was taken out from the cylindrical mold, and its active carbon content was determined to be 32% by weight.

The so formed molded fibrous adsorbent was packed in a filter having an inner diameter of 49 mm and a length of 79 mm, and water containing 2 ppm of free chlorine was passed through the filter for 2 hours at a flow rate of 10 liters per minute. The concentration of free chlorine in the filtrate after 2 hours passage of water was determined to be 0.2 ppm by the orthotolidine method. Water coming from the filter was free of chlorine smell.

EXAMPLE 23

A cylindrical fibrous adsorbent obtained in the same manner as in Example 22 was used for decolorization of an aqueous solution containing Methylene Blue. When the decolorizing effect was determined based on the relative adsorbance at a wave length of 425 m$\mu$, it was found that the decolorization ratior was 92%.

EXAMPLE 24

Procedures of Example 22 were repeated by melt-fixing activated manganese oxide on the filament surfaces instead of finely divided active carbon. The resulting filaments were molded in the same manner as in Example 22 to obtain a cylindrical fibrous adsorbent. When air containing 10 ppm of sulfurous acid gas was passed through the adsorbent while it was kept in contact with the adsorbent, the sulfurous acid gas content was reduced to 2 ppm.

EXAMPLE 25

Conjugate filaments in which sheath and core components had concentric sections were prepared by a customary method with use of polypropylene having a melting point of 175° C. as the sheath component and polyethylene terephthalate having a melting point of 259° C. as the core component. During the conjugate spinning, polypropylene was molten at 240° C. and polyethylene terephthalate was molten at 305° C. The spun filaments were wound up at a rate of 800 m/min and drawn in water maintained at 90° C. at a stretch ratio of 3. A powdery black catalyst CoO having an average size of 10 $\mu$ was sprinkled over the filaments, and they were heat-treated at 205° C. for 30 minutes. There was thus obtained a fibrous adsorbent of a cotton-like form in which the CoO catalyst was melt-adhered to the filament surface and interposed fixedly among the filaments. The CoO content of this adsorbent was 42.3% by weight. The adsorbent (6.77 g) was packed into a stainless steel tube having an inner diameter of 28 mm so that the length of the adsorbent layer would be 50 mm. A gaseous mixture containing 5% of carbon monoxide was passed through the tube at a flow rate of 0.5 liter per minute at room temperature, 50° C., 100° and 150° C., respectively, and the carbon monoxide removal ratio was determined by gas chromatography. Similar tests were conducted by employing 2.864 g of powdery CoO. Results are shown in Table 5.

Table 5

| Catalyst | CO Removal Ratio | | | |
|---|---|---|---|---|
| | room temperature | 50° C. | 100° C. | 150° C. |
| Product of this invention | 80 | 89 | 95 | 100 |
| Powdery CoO | 68 | 80 | 90 | 97 |

The cotton-like fibrous adsorbent obtained above and powdery CoO were separately packed into a cylinder of a sectional area of 6.15 cm$^2$, and the pressure loss was examined. Results are shown in FIG. 3. Curve A of FIG. 3 illustrates the results (relation between the flow rate and pressure loss) obtained when 2.864 g of CoO was packed (layer length = −0.4 cm), and Curve B illustrates the results obtained when 6.7 g of the fibrous adsorbent of this invention was packed (layer length = 5 cm).

EXAMPLE 26

The conjugate spinning and drawing was conducted in the same manner as in Example 25 by employing polystyrene having a melting point of 151° C. as a sheath polymer and polyethylene terephthalate having a melting point of 259° C. as a core polymer. The drawn tow was uniformly opened and a mixed adsorbing agent composed of 50% by weight of powdery CoO and 50% by weight of powdery CuO was sprinkled uniformly over the opened tow. Then the heat treatment was conducted at 185° C. for 40 minutes to obtain a tow-like fibrous adsorbent in which the filament surfaces were covered with the mixed adsorbing agent and the adsorbing agent content was 41.3% by weight. When the melt-adhered solids were eluted with a solvent for the sheath polymer and the eluate was analyzed, it was found that the CoO content was 38.1% and the Cu content was 41.1%. Thus, it is seen that there was not an extreme difference to the melt-adhesion degree between CoO and CuO. The so formed tow-like fibrous adsorbent was cut into 50 mm lengths and molded into a sheet-like form under heating. A filter having a configuration indicated in Table 6 was prepared from the so molded sheet. For comparison, a so-called active carbon filter of the same configuration as that of the above filter, packed with granular active carbon, was prepared. Properties of the filters were tested and compared. Results are shown in FIG. 3 and in FIG. 4.

Table 6

| | Filter of this invention | Active carbon filter |
|---|---|---|
| Adsorbing agent | CoO–CuO | granular active carbon |
| Weight of adsorbing agent (kg) | 0.57 | 2.81 |
| Dimension (mm) | 500 × 500 × 25 | |
| Gas passage area (m$^2$) | 0.25 | |
| Co concentration in passed gas (vol. %) | 5.00 | |
| Temperature of passed gas (° C.) | 35.00 | |
| Average flow amount (m$^3$/hr) | 495.00 | |
| Gas velocity (cm/sec) | 53.00 | |

We claim:

1. A fibrous adsorptive material in the form of tow, web, fabric, sheet, block, ball or flock consisting of a sheath-and-core conjugate fiber of a high melting polyethylene terephthalate core component and polystyrene as a low melting polymer sheath component, said low melting polymer sheath component having a melting point at least 40° C lower than that of the high melting polyethylene terephthalate core component, both components being present as continuous phases, finely divided particles of an adsorbent embedded in the surface of said low melting polymer component, said adsorbent being selected from the group consisting of active carbon, active clay, active alumina, silica gel, active zeolite, molecular sieve, white carbon, cyclodextrin, ion-exchange resins, copper, platinum, silver, zinc oxide, nickel oxide, manganese oxide, cobalt oxide and cerium oxide, and said finely divided particles of said adsorbent being firmly secured by melt-adhering to the surface of said low melting polymer component with the bottom portions of said finely divided particles of said adsorbent being embedded therein by heating the conjugate fiber at a temperature higher than the melting point of the low melting polymer component contained in said conjugate fiber, but lower than the melting point of the high melting polyethylene terephthalate component contained therein.

2. The fibrous adsorptive material of claim 1 wherein said core component accounts for 40–80% of the entire cross sectional area of said conjugate fiber.

3. The fibrous adsorbent material of claim 1 wherein said low melting component comprises from 25–50% by weight of said conjugate fiber.

4. The fibrous adsorbent material of claim 1 wherein said adsorbent particles have a particle size of at least 100 mesh and wherein the amount of said adsorbent is in the range of 10–80% by weight based upon the total weight of the adsorbent-containing fiber.

* * * * *